(12) United States Patent
Johnson

(10) Patent No.: US 7,509,797 B2
(45) Date of Patent: Mar. 31, 2009

(54) THRUST VECTORING MISSILE TURBOJET

(75) Inventor: James Edward Johnson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 11/118,171

(22) Filed: Apr. 29, 2005

(65) Prior Publication Data
US 2006/0242942 A1 Nov. 2, 2006

(51) Int. Cl.
*F02K 1/00* (2006.01)
(52) U.S. Cl. .................. 60/228; 239/265.17; 244/53 R
(58) Field of Classification Search .......... 60/226.1, 60/761–766, 262, 770, 771, 39.281, 233, 60/228; 239/265.17; 244/53 R, 56, 3.22
See application file for complete search history.

(56) References Cited

U.S. PATENT DOCUMENTS

| | | | |
|---|---|---|---|
| 2,846,843 A | 8/1958 | Clark et al. | |
| 3,296,804 A | 1/1967 | Keenan et al. | |
| 3,382,670 A | 5/1968 | Venable | |
| 3,420,060 A | 1/1969 | Ostroff et al. | |
| 3,677,012 A | 7/1972 | Batscha | |
| 3,729,957 A | 5/1973 | Petrie et al. | |
| 3,779,007 A * | 12/1973 | Lavash | 60/39.281 |
| 3,826,586 A * | 7/1974 | Richards | 415/42 |
| 3,830,056 A | 8/1974 | Willis et al. | |
| 3,834,160 A * | 9/1974 | Moehring et al. | 60/243 |
| 3,938,328 A | 2/1976 | Klees | |
| 4,038,817 A * | 8/1977 | Snow et al. | 60/204 |
| 4,043,121 A | 8/1977 | Thomas et al. | |
| 4,052,847 A | 10/1977 | Rodgers et al. | |
| 4,054,030 A | 10/1977 | Pedersen | |
| 4,055,042 A | 10/1977 | Colley | |
| 4,060,981 A | 12/1977 | Hampton | |
| 4,064,692 A | 12/1977 | Johnson et al. | |
| 4,068,471 A | 1/1978 | Simmons | |
| 4,069,661 A * | 1/1978 | Rundell et al. | 60/204 |
| 4,072,008 A | 2/1978 | Kenworthy et al. | |
| 4,080,785 A * | 3/1978 | Koff et al. | 60/226.3 |
| 4,095,420 A * | 6/1978 | Abernethy et al. | 60/204 |
| 4,175,384 A * | 11/1979 | Wagenknecht et al. | 60/226.3 |

(Continued)

FOREIGN PATENT DOCUMENTS

GB   757818 A   9/1956

(Continued)

OTHER PUBLICATIONS

GE Aircraft Engines, "J93 Engine Cross Section," publicly available more than one year before Mar. 1, 2005, singe page.

(Continued)

*Primary Examiner*—William H Rodríguez
(74) *Attorney, Agent, or Firm*—William S. Andes; Francis L. Conte

(57) ABSTRACT

A turbojet engine includes a core engine, an afterburner, and a converging-diverging exhaust nozzle in serial flow communication. A thrust vectoring system is joined between a compressor and the nozzle. A controller is operatively joined to the thrust vectoring system for selectively varying distribution of air bled from the compressor into the exhaust nozzle for vectoring propulsion thrust.

21 Claims, 3 Drawing Sheets

U.S. PATENT DOCUMENTS

| | | | |
|---|---|---|---|
| 4,176,792 A | 12/1979 | McCardle, Jr. | |
| 4,435,958 A * | 3/1984 | Klees | 60/204 |
| 4,551,971 A | 11/1985 | Suzuki | |
| 4,958,489 A | 9/1990 | Simmons | |
| 5,349,814 A | 9/1994 | Ciokajlo et al. | |
| 5,402,638 A | 4/1995 | Johnson | |
| 5,404,713 A * | 4/1995 | Johnson | 60/204 |
| 5,435,127 A * | 7/1995 | Luffy et al. | 60/204 |
| 5,806,303 A * | 9/1998 | Johnson | 60/262 |
| 5,809,772 A * | 9/1998 | Giffin et al. | 60/226.1 |
| 5,996,936 A * | 12/1999 | Mueller | 244/53 R |
| 6,112,513 A * | 9/2000 | Catt et al. | 60/204 |
| 6,336,319 B1 | 1/2002 | Koshoffer | |
| 6,487,847 B1 * | 12/2002 | Snow et al. | 60/235 |
| 6,895,741 B2 * | 5/2005 | Rago et al. | 60/226.1 |
| 7,013,636 B2 * | 3/2006 | Iya et al. | 60/204 |
| 7,185,485 B2 * | 3/2007 | Lewis | 60/243 |
| 7,216,475 B2 * | 5/2007 | Johnson | 60/226.1 |
| 2003/0074884 A1 * | 4/2003 | Snow et al. | 60/204 |
| 2003/0145577 A1 | 8/2003 | Hunter et al. | |
| 2005/0081509 A1 | 4/2005 | Johnson | |
| 2005/0284150 A1 | 12/2005 | Dittmar et al. | |
| 2006/0042252 A1 * | 3/2006 | Derouineau | 60/703 |
| 2007/0044476 A1 * | 3/2007 | Koshoffer | 60/776 |

FOREIGN PATENT DOCUMENTS

| | | | |
|---|---|---|---|
| GB | 822299 A | 10/1959 | |
| GB | 827744 A | 2/1960 | |
| GB | 921727 A | 3/1963 | |
| GB | 1069872 A | 5/1967 | |
| GB | 1273017 A | 5/1972 | |
| GB | 1452267 A | 10/1976 | |
| GB | 2054745 A | 2/1981 | |
| WO | WO 2004/022948 A1 | 3/2004 | |

OTHER PUBLICATIONS

Janes, "USA: Engines," Jane's All the World's Aircraft, 1986, pp: cover, 958, 959, 962, & 963.

www.fiddlergreen.net, "Raytheon Tomahawk B6M-109 Cruise Missile," Mar. 1, 2005, 5 pages, Printed article only.

www.labiker.org, "001- Flight of the Valkyrie," Mar. 15, 2005, 17 pages, Printed article only.

Johnson, U.S. Appl. No. , concurrently filed Apr. 29, 2005, "Fladed Supersonic Missile Turbojet,".

Johnson, U.S. Appl. No. , concurrently filed Apr. 29, 2005, "Supersonic Missile Turbojet Engine,".

Johnson, U.S. Appl. No. , concurrently filed Apr. 29, 2005, "Self Powered Missile Turbojet,".

Johnson, U.S. Appl. No. 11/118698, concurrently filed Apr. 29, 2005, "Fladed Supersonic Missile Turbojet,".

Johnson, U.S. Appl. No. 11/118967, concurrently filed Apr. 29, 2005, "Supersonic Missile Turbojet Engine,".

Johnson, U.S. Appl. No. 11/118966, concurrently filed Apr. 29, 2005, "Self Powered Missile Turbojet,".

* cited by examiner

THRUST VECTORING MISSILE TURBOJET

BACKGROUND OF THE INVENTION

The present invention relates generally to gas turbine engines, and, more specifically, to supersonic missile engines.

Typical commercial and military aircraft are powered by multi-rotor turbofan gas turbine engines. A forward fan is powered by a low pressure turbine (LPT). A multistage axial compressor follows the fan and is powered by a multistage high pressure turbine (HPT).

An annular combustor is located between the compressor and the HPT for mixing fuel with the pressurized air and generating hot combustion gases from which energy is extracted by the HPT and LPT during operation. The rotor blades of the two turbines are joined to corresponding rotor shafts or spools to the rotor blades of the fan and the compressor.

The turbofan engine is sized for producing near maximum propulsion thrust during takeoff operation of the aircraft being powered thereby during which maximum airflow or mass flow is achieved in the engine at a correspondingly high rotor speed of the HPT and compressor, and a lower speed for the LPT and fan.

In order to provide additional propulsion thrust for military aircraft, and typically for supersonic operation thereof, an augmentor or afterburner may be introduced following the turbofan core engine. The typical afterburner includes an annular combustion liner, with a plurality of fuel spray bars and V-gutter flameholders at the forward end thereof. An articulated converging-diverging (CD) nozzle is disposed at the aft end of the afterburner for discharging the combustion exhaust gases during operation.

The CD exhaust nozzle is typically formed of a row of primary exhaust flaps which converge in the downstream direction to a throat of minimum flow area from which a row of secondary exhaust flaps diverge to the nozzle outlet for providing controlled diffusion of the exhaust flow being discharged. A suitable drive train, including one or more actuators and linkages, controls the kinematic motion of the exhaust flaps in accordance with predetermined schedules for the converging and diverging slopes of the flaps and the flow area at the throat therebetween.

During subsonic operation of the aircraft below Mach 1 when the afterburner is operated dry without fuel flow through the spray bars thereof, the nozzle throat has a minimum flow area for maximizing performance of the core engine.

During wet operation of the afterburner when fuel flow is scheduled through the spray bars, the fuel is mixed with the spent combustion gases from the core engine and ignited to re-energize the combustion gases and provide additional propulsion thrust from the engine.

Full-time operation of the afterburner permits transonic and supersonic operation of the aircraft above Mach 1 which requires the increased propulsion thrust from the engine. And during wet operation, the CD nozzle is scheduled to increase the flow area of the throat for accommodating the increased mass flow of the combustion gases discharged therethrough for maintaining efficiency and performance of the engine during supersonic flight.

Whereas gas turbine engines specifically configured for powering aircraft in flight are relatively complex for the required safety of operation for carrying people in flight over an extended number of flight cycles, gas turbine engines for missile applications may be considerably simpler in configuration, and smaller in size, and specifically configured for single flight applications for reaching the intended military target, without the need to carry people.

Various forms of turbojet and turbofan gas turbine engines are known for powering military missiles typically at subsonic flight speeds. The engines are configured as simply as possible and as small as possible for producing the required propulsion thrust for the intended flight range.

Air breathing missiles, like their counterpart manned aircraft, require a suitable inlet for channeling ambient air to the engine. The engine includes a suitable compressor for pressurizing the air which is then mixed with fuel in a combustor for generating hot combustion gases. Energy is extracted from the combustion gases in variously configured turbines for producing propulsion thrust to power the missile.

Since currently known missiles have subsonic flight limits, afterburners and the associated increase in size and complexity are avoided in such missiles.

However, supersonic flight, air breathing missile systems can provide corresponding advantages for military applications and are the next progression in the development of missile systems. In particular, air breathing missile systems in the Mach 3.0-3.5 class require substantial propulsion thrust capability from subsonic, through transonic, and to the maximum supersonic flight speeds required. Since weight is a paramount design objective for all flying systems, supersonic missiles should maximize payload capability while minimizing missile size, weight, and cost, which are competing objectives.

The gas turbine engine designed for a supersonic missile system fundamentally affects the entire configuration of the missile and its payload capability and flight range. A suitable engine should have minimum engine size and provide balanced thrust production at key transonic and supersonic flight conditions.

The engine design should simplify the design requirements of the Mach 3.0-3.5 class air inlet for the missile. Correspondingly, the engine design should simplify the exhaust system for the Mach 3.0-3.5 missile.

The engine design should address the mitigation of air vehicle, or missile, and engine installation losses. The installed engine may further include thrust vectoring capabilities but should be integrated in an efficient manner.

Since the engine must produce electrical power in addition to propulsion thrust during operation, the engine design as integrated in the missile should also include improved power generation and power supply capabilities therein. The typical engine control and accessories should be minimized in size and packaging for effecting a compact missile system.

Since the engine generates considerable heat during operation, and the missile will fly at substantially maximum flight speed over its intended flight range, critical thermal management issues must also be addressed in the engine design for achieving reliable operation of the missile to its intended target.

And, the many and varied competing design factors in a supersonic class air breathing missile must also be addressed for providing minimum weight of the missile and engine system, minimum size, maximum performance and reliability, all with the minimum cost of production specific to the propulsion engine itself.

Accordingly, it is desired to provide an improved gas turbine engine for a supersonic missile application.

BRIEF DESCRIPTION OF THE INVENTION

A turbojet engine includes a core engine, an afterburner, and a converging-diverging exhaust nozzle in serial flow communication. A thrust vectoring system is joined between a compressor and the nozzle. A controller is operatively joined to the thrust vectoring system for selectively varying distribution of air bled from the compressor into the exhaust nozzle for vectoring propulsion thrust.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
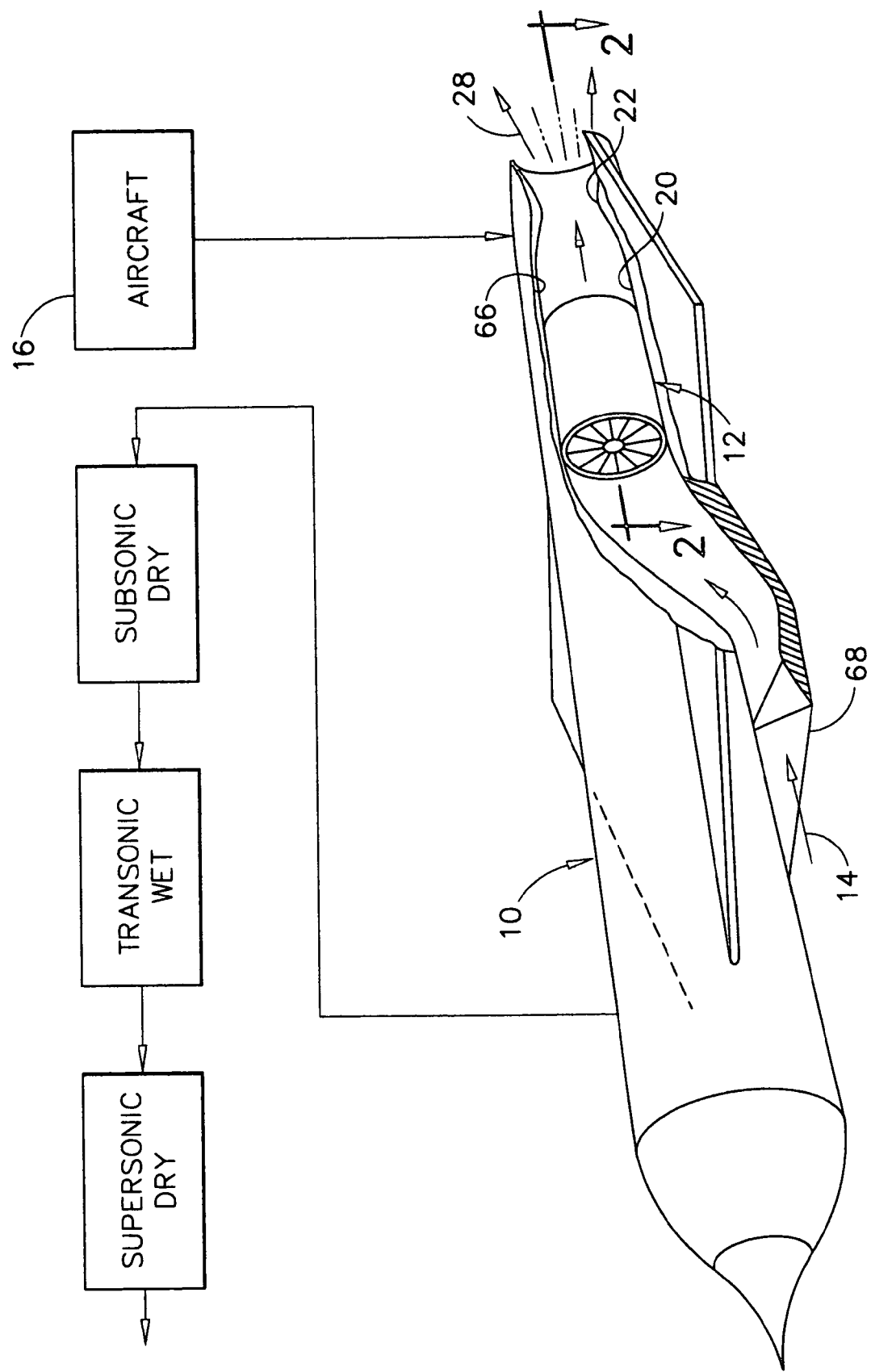
FIG. 1 is a partly schematic isometric view of an exemplary supersonic missile powered by a turbojet gas turbine engine.

Illustrated in FIG. 1 is an exemplary supersonic missile 10 powered by a turbojet gas turbine engine 12 suitably mounted inside the aft end thereof. The missile 10 itself may have any suitable configuration and size for flight operation from subsonic, through transonic, and into supersonic flight speeds in the class of Mach 3.0-3.5.

The missile is air breathing and ingests ambient air 14 during operation which is compressed inside the turbojet engine 12 for producing all of the propulsion thrust required for subsonic through supersonic operation of the missile.

In a typical application, the missile 10 is sized and configured for being carried to high altitude by a corresponding military aircraft 16 which will launch the missile at altitude for subsequent travel to the intended target. The missile is released from the aircraft and powered by the turbojet engine which is operated in turn for accelerating the missile from subsonic speed when released from the aircraft, through transonic speed and into the intended supersonic Mach 3.0-3.5 maximum speed thereof.

Figure 2:
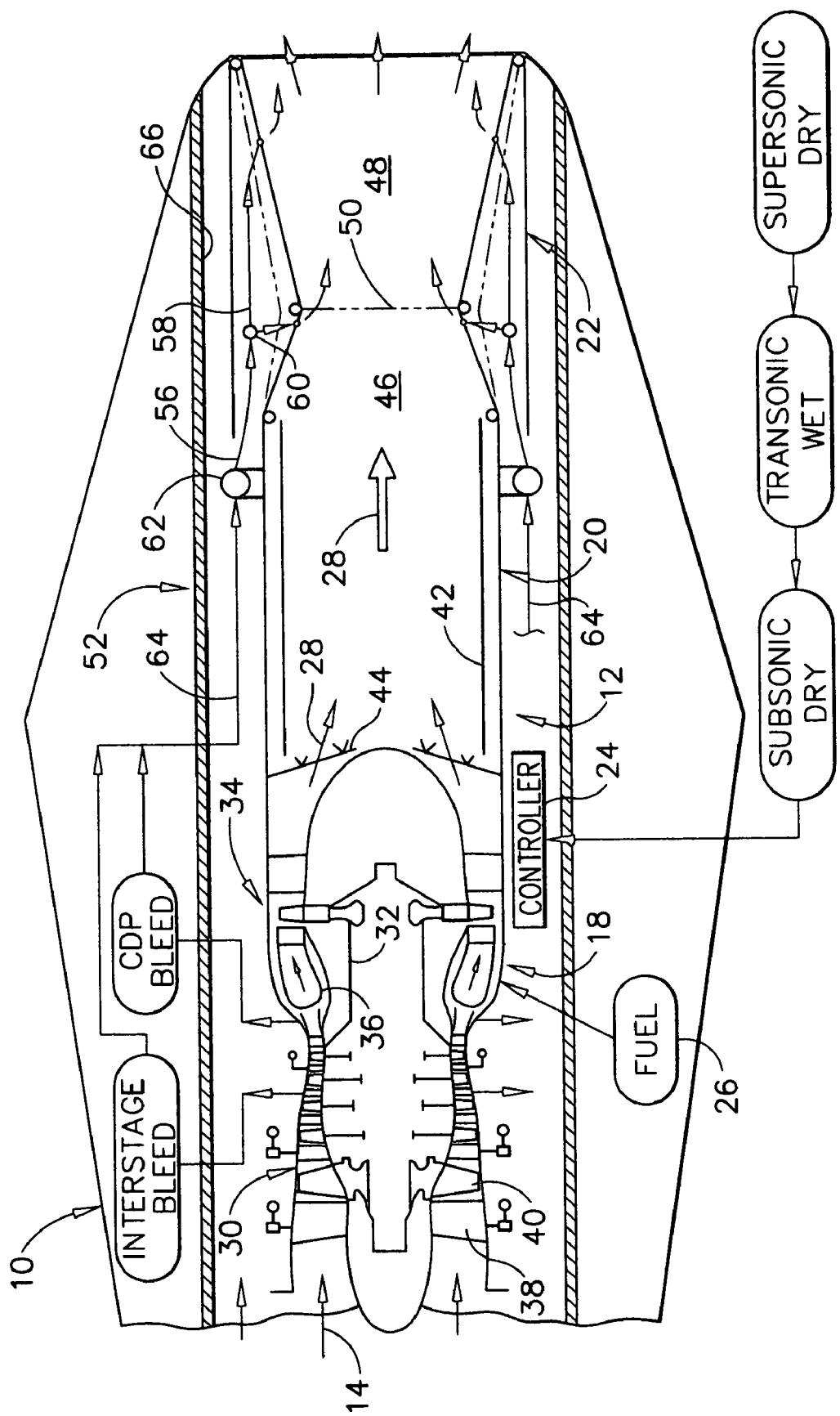
FIG. 2 is an enlarged axial sectional view of the turbojet engine illustrated in FIG. 1 and taken along line 2-2.

The turbojet engine 12 is illustrated in more detail in FIG. 2 and includes a core engine 18, an augmentor or afterburner 20, and a converging-diverging (CD) exhaust nozzle 22 disposed in serial flow communication coaxially along a longitudinal or axial centerline axis extending longitudinally through the engine and surrounding missile.

The engine also includes a suitable controller 24, such as a conventional digitally programmable computer, which is operatively joined to the core engine 18, afterburner 20, and exhaust nozzle 22 for controlling and coordinating operation thereof. The controller is suitably configured, in software for example, for scheduling fuel 26 to the core engine and afterburner which is mixed with the incoming air 14 for generating hot combustion gases 28 during operation.

In particular, the controller 24 provides means for scheduling fuel to the afterburner in a predetermined schedule for operating the afterburner dry without additional fuel injected therein during subsonic flight of the engine and missile, operating the afterburner wet with additional fuel injected therein during transonic flight operation of the missile, and again operating the afterburner dry without additional fuel injected therein during supersonic flight of the missile in turn as the engine accelerates the missile in speed from its initial subsonic speed below Mach 1 to the intended maximum supersonic speed, such as the Mach 3.0 to 3.5 maximum flight speed desired.

The controller therefore has the technical effect of operating the engine components to achieve the necessary propulsion thrust for subsonic, transonic, and supersonic flight operation of the missile powered by the engine.

For transonic flight operation between subsonic and supersonic flight speeds, the afterburner is operated wet with additional fuel being injected therein for re-energizing the combustion gases and providing the additional propulsion thrust for powering the missile through the portion of the flight envelope in which the sound barrier is broken. The afterburner should be operated wet only as required for the specific missile propulsion requirements of the flight envelope to minimize fuel consumption.

For example, transonic wet operation may occur in the exemplary range of Mach 0.8 to about Mach 2.0. Above Mach 2.0 operation, the afterburner is operated dry to conserve fuel and maximize missile flight range. And, if required, the afterburner may again be operated wet, for example greater than about Mach 3.0, to meet the higher propulsion thrust requirements of the missile in this portion of the flight envelope.

The core engine 18 is illustrated in FIG. 2 and includes a multistage axial compressor 30 which pressurizes the ambient air 14 received from outside the missile. The compressor 30 is joined by a shaft or rotor 32 to a single-stage high pressure turbine (HPT) 34 disposed downstream therefrom. The HPT includes a stator nozzle and a row of turbine rotor blades which power the rotor 32.

An annular combustor 36 is disposed between the compressor and HPT and receives the pressurized air from the compressor which is then mixed with fuel in the combustor for generating the hot combustion gases 28 that are discharged through the turbine which extracts energy therefrom to in turn power the compressor.

An exemplary configuration of the compressor 30 includes sequential stages or rows of cooperating stator vanes 38 extending radially inwardly from a supporting stator casing, and corresponding rows of rotor or compressor blades 40 extending radially outwardly from corresponding supporting disks joined to the rotor 32. The first two and last stages of the compressor vanes 38 are variable, with each variable vane being rotatable around a radial axis thereof for varying the flow area and direction of the inter-vane flow passages during operation. Each row of variable vanes 38 includes a conventional drive train for simultaneously rotating each of the vanes in unison.

Variable stator vanes in axial compressors are conventionally known along with their corresponding actuation or drive trains which include corresponding levers, unison rings, and actuators for adjusting the rotary position of the vanes in each row. The corresponding drive trains for the variable vanes are in turn operatively joined to the engine controller 24 which controls the precise rotary position of the various variable vane stages for maintaining suitable stall margin of the compressor during the entire flight envelope as well as maximizing efficiency of the compressor.

Conventional axial compressors in modern turbojet or turbofan aircraft engines typically include multiple stages of variable stator vanes at the forward end of the compressor with the last several stages of stator vanes being fixed, and not variable. In contrast, the turbojet engine illustrated in FIG. 2 additionally introduces variable stator rear vanes 38 in the last compressor stage for effecting different positions corresponding with subsonic dry operation and supersonic dry operation in particular.

All of the variable stator vanes in the compressor are suitably scheduled for corresponding rotary positions thereof for maintaining adequate stall margin of the compressor during the entire flight envelope of the missile.

However, the rotary position of the last stage compressor vanes is suitably scheduled in the controller 24 to limit the physical rotational speed of the rotor 32 during dry supersonic flight requiring maximum airflow through the compressor, with that rotor speed being limited to about the physical rotary speed of the rotor 32 during dry subsonic flight requiring correspondingly less airflow through the compressor.

The single-rotor afterburning turbojet engine illustrated in FIG. 2 provides substantial benefits for the Mach 3.0-3.5 class air breathing missile. Balanced thrust production can be achieved by incorporating the afterburner 20 for transonic propulsion thrust needs while providing the desired dry Mach 3.0-3.5 propulsion thrust levels by suitable scheduling of the airflow through the engine and turbine inlet temperature.

The specific introduction of the last-stage rear variable stator vanes in the compressor 30 permits tailoring of the compressor map flow-speed characteristic through the engine to limit operating physical speeds at Mach 3.0-3.5 to about the same levels of rotor speed at sea level static values. This allows a relatively high corrected speed to be used in the design of the compressor which in turn minimizes the number of stages and resulting cost of the high specific flow, low radius ratio compression system. Furthermore, the accompanying high physical rotary speed of the rotor 32 minimizes diameter of the high pressure turbine 34 for a given turbine aerodynamic loading, keeping the maximum envelope diameter of the engine as small as possible.

The afterburner 20 illustrated in FIG. 2 may have a conventional configuration derived from corresponding augmented aircraft engines but sized sufficiently small for the small missile application. The afterburner 20 may include a tubular combustion liner 42 mounted concentrically inside a surrounding annular casing to define an annular bypass duct radially therebetween.

The inlet end of the afterburner liner 42 receives the spent combustion gases 28 from the core engine, a portion of which may be diverted through the bypass duct for cooling the afterburner liner during operation.

A plurality of conventional fuel spray bars 44, with conventional V-gutter flameholders attached thereto, extend radially inwardly from the afterburner casing at the forward end of the afterburner liner 42. The fuel spray bars 44 are operatively joined to the engine controller 24 for scheduling fuel flow to the spray bars of the afterburner during operation.

In this way, the engine controller 24 controls operation of both the main combustor 36 in the core engine and the afterburner combustor through the corresponding fuel injectors therefor, with the fuel being scheduled thereto in accordance with the subsonic, transonic, and supersonic flight requirements of the turbojet engine.

Figure 3:
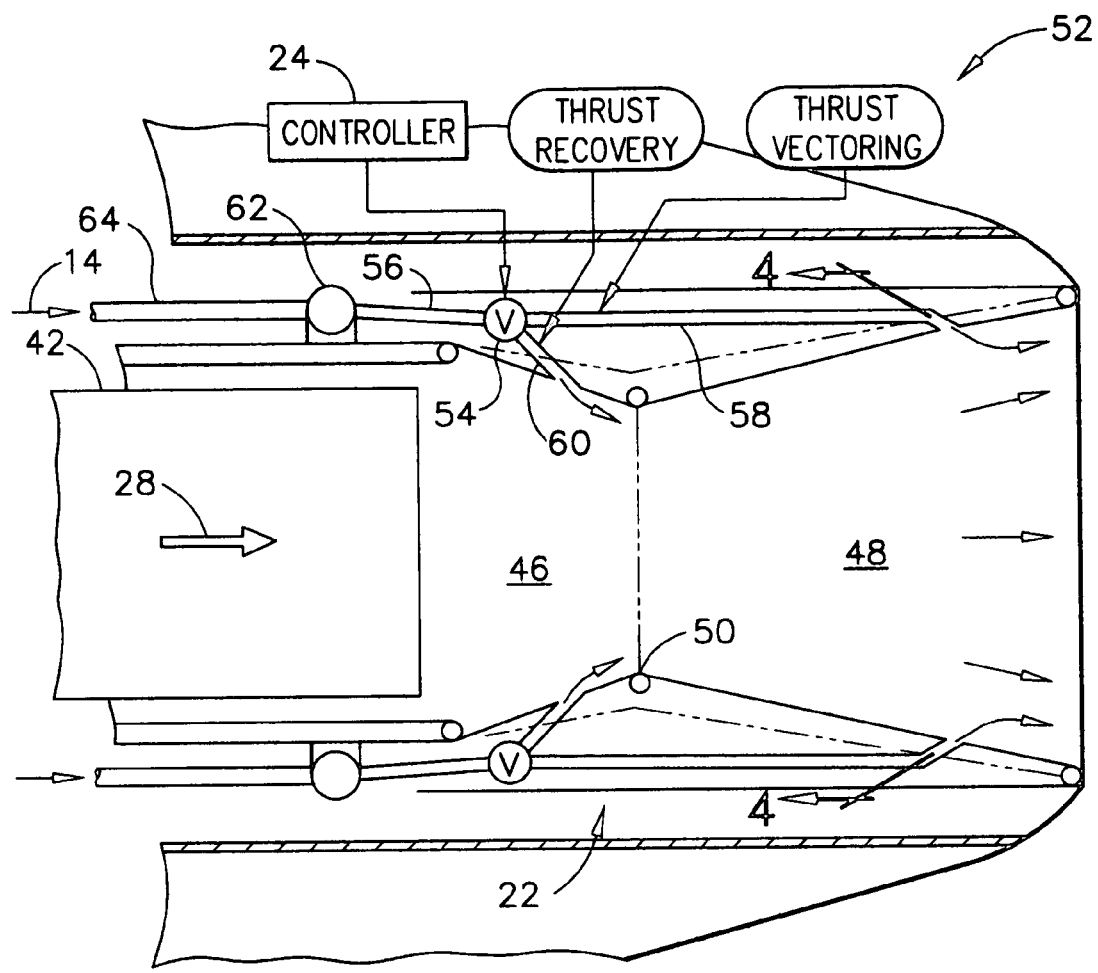
FIG. 3 is an enlarged axial sectional view of a portion of the exhaust nozzle illustrated in FIG. 2.

The exhaust nozzle 22 is illustrated in more detail in FIG. 3 in an exemplary embodiment. The nozzle may include a plurality of articulated primary flaps defining a converging inlet duct 46. A plurality of articulated or pivotable secondary flaps are disposed downstream therefrom to define a diverging outlet duct 48. The inlet duct 46 converges aft in flow area to a throat 50 of minimum flow area, and the outlet duct 48 diverges aft therefrom for diffusing the combustion gases 28 discharged from the nozzle outlet during operation.

The primary and secondary flaps are operatively joined to a suitable drive train including linkages and one or more actuators for varying slope of the flaps in their converging and diverging inclines, while also varying flow area (typically designated A8) at the throat 50. The controller 24 is configured with suitable software for scheduling the desired flow area of the throat 50 and the corresponding inclinations of the converging and diverging ducts 46,48 for cooperating with the core engine during operation.

For example, the controller 24 is specifically configured for adjusting the exhaust nozzle 22 for varying flow area of the throat 50 for minimum flow area during dry subsonic flight of the missile, and with maximum flow area during wet transonic flight of the missile, and with an intermediate flow area between the minimum and maximum flow areas during the dry or wet supersonic flight of the missile all of which require different mass flow rates of the compressed air and combustion gases channeled through the turbojet engine during operation.

Unlike a typical augmented aircraft engine in which the afterburner thereof must be operated full time during supersonic flight in excess of Mach 2, the afterburner 22 in the turbojet engine illustrated in FIG. 2 is operated wet solely or primarily in the transonic portion of the flight envelope, while being operated dry both in the slower subsonic portion and the faster supersonic portion of the flight envelope. Correspondingly, the rear variable stator vanes of the compressor 30 are coordinated with increasing flight speed, and with operation of the afterburner, to prevent excessive speed of the rotor 32 while still providing the maximum mass flow rate through the turbojet engine required for efficient propulsion thrust in the Mach 3.0-3.5 flight envelope.

The CD exhaust nozzle 22 illustrated in FIG. 3 may have any conventional configuration such as that found in military aircraft suitably sized for the substantially smaller application thereof in the supersonic missile. The nozzle may be circular in cross section or rectangular in accordance with conventional aircraft practice and should be simplified as much as possible for the disposable application of the turbojet engine in the missile.

Other embodiments of the CD exhaust nozzle may be used for further simplifying the features thereof while providing the desired converging and diverging exhaust ducts with the intermediate throat therebetween for matching operation of the core engine for the subsonic, transonic, and supersonic flight regimes.

FIG. 2 additionally illustrates a thrust vectoring apparatus or system 52 operatively joined at an inlet end thereof to the compressor 30 for receiving pressurized air 14 therefrom. The vectoring system is also operatively joined at an outlet end thereof to the exhaust nozzle 22 for selectively discharging the pressurized air therein.

The controller 24 is also operatively joined to the vectoring system 52 for controlling operation thereof including varying the circumferential distribution of the pressurized air 14 around the exhaust nozzle 22 in which it is mixed with the combustion gases for thereby vectoring thrust from the combustion gases as they are discharged through the nozzle outlet.

Thrust vectoring capability is known in the art and typically requires complex articulated exhaust nozzle flaps which can be adjusted from their axisymmetrical nominal positions for straight axial propulsion to laterally distorted or skewed positions for biasing propulsion thrust from the nominal axial direction. In this way, a portion of the exhaust gases is vectored askew from the axial axis of the nozzle for providing an off axis component of the thrust to vector, and thereby alter the flight direction of the aircraft.

However, the exhaust nozzle 22 illustrated in FIG. 2 is relatively simple and has axisymmetrical flaps defining the converging inlet duct 46 and diverging outlet duct 48 without mechanical thrust vectoring asymmetry or capability.

Instead, the thrust vectoring system 52 is introduced to cooperate with the exhaust nozzle 22 for introducing fluidic thrust vectoring capability using pressurized air bled from the compressor to skew or laterally bias the exhaust gases discharged from the nozzle for effecting thrust vectoring capability in the missile.

FIG. 3 illustrates schematically the thrust vectoring system 52 in more detail. A plurality of flow distribution valves 54 are spaced apart circumferentially around the exhaust nozzle in any convenient location. The valves 54 are joined in flow communication with the compressor 30 illustrated in FIG. 2 by a plurality of inlet conduits 56. The valves are also joined in flow communication with the exhaust nozzle 22 itself by another plurality of outlet conduits 58 also spaced apart circumferentially around the nozzle.

Figure 4:
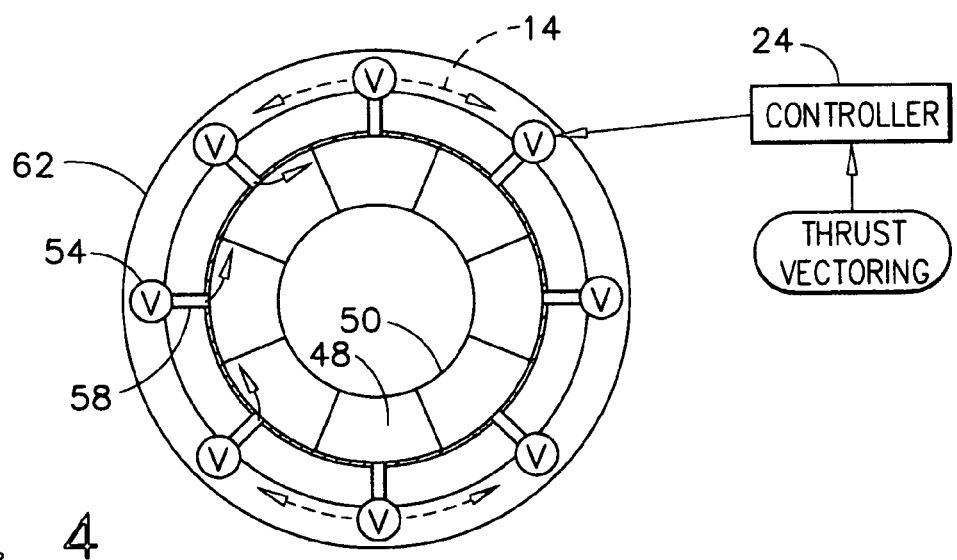
FIG. 4 is a radial sectional view of the exhaust nozzle illustrated in FIG. 3, and taken along line 44.

FIG. 4 illustrates schematically in additional detail the use of eight of the distribution valves 54 spaced uniformly around the circumference of the exhaust nozzle, each with a corresponding outlet conduit 58 joined to the nozzle for injecting bleed air from the compressor.

The controller 24 is operatively joined to each of the electromechanical valves 54, and is further configured, in additional software for example, for adjusting flow of the pressurized bleed air 14 through the individual valves 54 for varying distribution thereof to vector the propulsion thrust.

In the exemplary embodiment illustrated in FIGS. 3 and 4, the outlet conduits extend from the several distribution valves 54 in the form of aft outlet conduits 58 which are correspondingly joined to the diverging outlet duct 48 of the exhaust nozzle for discharging the pressurized air therein. The aft outlet conduits 58 extend axially outside the nozzle and terminate in corresponding outlets preferably near the aft end of the diverging outlet duct 48.

As shown in FIG. 4, the valves 54 may be independently operated for biasing or skewing the pressurized air to one side of the nozzle for effecting thrust vectoring therefrom. The local introduction of pressurized air in the outlet duct of the nozzle interrupts the otherwise axisymmetric or uniform distribution thereof to introduce thrust vectoring for in turn steering the missile during its short flight to the intended target.

Each of the distribution valves 54 illustrated in FIG. 3 preferably also includes a corresponding forward outlet conduit 60 joined in flow communication with the converging inlet duct 46 upstream of the throat 50. In this embodiment, the distribution valves 54 are preferably configured for distributing or splitting the pressurized bleed air axially between the forward and aft outlet conduits 60,58 for discharge into both the inlet and outlet ducts 46,48, respectively. In this way, portions of the same bleed air from the compressor may be divided between injection into the inlet duct 46 and the outlet duct 48.

The distribution valves 54 are preferably mechanically configured for increasing flow of the pressurized bypass air to the aft outlet conduits 58 while simultaneously decreasing flow to the forward outlet conduits 60, and vice versa. In other words, the valves 54 are also effective for increasing flow to the forward outlet conduits 60 while simultaneously decreasing flow to the aft outlet conduits 58.

The distribution valves 54 may have any suitable or conventional configuration so that the inlet bleed air thereto is split or divided and discharged through the two sets of aft and forward outlet conduits 58,60 for distributing the limited bleed air.

In a preferred embodiment, the distribution valves 54 are suitably configured for distributing the bleed air flow uniformly through the full set of forward outlet conduits 60 for uniform circumferential injection into the inlet duct 46 to effect efficient pressure recovery in the nozzle and minimize the loss of energy therefrom. It is noted that any air bled from the compressor reduces efficiency of the engine since it is not being used in the combustion process. By reintroducing the bleed air into the inlet duct 46 of the nozzle when thrust vectoring is not required, energy in the bleed air may be recaptured.

The forward outlet conduits 60 preferably terminate in outlets spaced upstream from the nozzle throat 50 so that the returning bleed air joins the combustion gases as they are accelerated through the throat and then diffused in the outlet duct 48 for efficient pressure recovery and generation of propulsion thrust.

Correspondingly, the distribution valves 54 are preferably also configured for distributing the bleed flow nonuniformly or asymmetrically through the aft outlet conduits 58 when desired to effect thrust vectoring. As indicated above, the bleed air may be discharged into the outlet duct 48 biased in flowrate and effect for skewing the propulsion thrust from the nozzle to effect the desired direction of thrust vectoring.

In this way, the distribution valves 54 may be configured in quantity and effect for correspondingly controlling distribution of the common bleed air from the compressor separately to the converging inlet duct 46 and diverging outlet duct 48 of the nozzle through the corresponding forward and aft outlet conduits 60,58. Thrust vectoring may thusly be achieved by fluidically changing the otherwise uniform distribution of the combustion gases discharged from the nozzle for introducing a lateral component of thrust for thrust vectoring and steering the missile during its flight at altitude.

For straight flight propulsion when minimum if any thrust vectoring is required, the bleed air is preferably directed through the forward outlet conduits 60 for pressure recovery through the nozzle for enhancing efficiency and range of the engine and missile with the limited quantity of fuel carried therein.

In order to improve the simplicity of the thrust vectoring system 52 illustrated in FIGS. 2-4, an annular distribution manifold 62 is mounted outside the forward end of the exhaust nozzle in flow communication with the full complement of distribution valves 54 by the corresponding inlet conduits 56. Correspondingly, a plurality of inlet bleed conduits 64 join the common supply manifold 62 in flow communication with the compressor 30.

One or more of the manifolds 62 may be used for commonly feeding one or more groups of the distribution valves 54 in the simplest configuration feasible. For example, the eight exemplary valves 54 may be joined to the common manifold 62, which in turn may be joined to the compressor by four of the bleed conduits 64 uniformly spaced apart around the core engine in an exemplary configuration. And, the desired flow splitting capability of the valves 54 may be introduced in one or more sets of different valves configured specifically therefor as desired.

As indicated above, the compressor 30 illustrated in FIG. 2 is a multistage axial compressor, having five sequential stages for example, for progressively increasing pressure of the air as it is pressurized during flow therethrough. In one embodiment, the bleed conduits 64 are joined in flow communication with an intermediate stage, such as the third stage, of the compressor for bleeding interstage bleed air therefrom at a corresponding pressure. Interstage bleed air may be sufficient for effecting suitable thrust vectoring in the nozzle while also minimizing the loss of efficiency in the engine due to extraction thereof prior to the combustion process.

In an alternate embodiment also illustrated schematically in FIG. 2, the bleed conduit 64 may be joined in flow communication with the discharge end of the compressor for bleeding compressor discharge pressure (CDP) air therefrom having maximum pressure from the compressor. The higher pressure CDP bleed air will have more of an effect in vectoring thrust from the exhaust nozzle but at a corresponding loss of efficiency of the engine.

As indicated above, air bled from the compressor reduces engine efficiency since it is not used in the combustion process. Since the bleed air used for thrust vectoring is injected near the aft end of the diverging outlet duct 48 for maximum vectoring effectiveness, little if any pressure recovery of that bleed air is obtained.

However, when thrust vectoring is not required, the bleed air is preferably diverted by the distribution valves 54 through the forward outlet conduits 60 into the converging inlet duct 46 where it joins the combustion gases being discharged through the nozzle, and therefore pressure recovery of the bleed air may be obtained for increasing efficiency and thrust of the engine.

In the preferred embodiment illustrated in FIG. 2, the bleed conduits 64, manifold 62, and inlet conduits 56 provide an unobstructed, continuous flowpath full time or always on from the compressor 30 to the distribution valves 54. The various stages of the compressor 30 may therefore be designed for maintaining a suitable stall margin and maximum performance notwithstanding the air bled therefrom.

Correspondingly, the distribution valves 54 are also configured for continuous, full time operation and are always on for discharging the bleed air through either the aft outlet conduits 58 or the forward outlet conduits 60, or with various flow splits therebetween. The response time of adjusting the distribution valves 54 may be relatively quick with conventional valve technology, such as about one second for example.

In this way, the distribution valves may be adjusted continuously for adjusting thrust vectoring from the exhaust nozzle as required for the intended flight path of the missile. And, the quick response time of the full time distribution valves and continuous bleed of the pressurized air from the compressor ensures quick response of the missile to effect thrust vectoring changes.

As shown in FIGS. 1 and 2, the turbojet engine 12 is integrated or mounted inside the aft end of the missile 10 in a corresponding tubular engine bay 66 provided therefor. The turbojet engine 12 illustrated in FIG. 1 further includes an inlet air duct or intake 68 extending forward from the core engine in axial alignment therewith, with the intake extending forwardly through the side of the missile body or casing for receiving ambient air during subsonic to supersonic operation.

The external portion of the intake 68 should be suitably configured for efficiently receiving ambient air 14 under ram pressure as the missile is operated from subsonic through supersonic operation. In supersonic operation, shock waves will be generated in the entrance to the intake for channeling subsonic inlet air into the core engine.

The resulting afterburning turbojet engine disclosed above is relatively small and compact and can lead to a low cost, effective propulsion solution for a volume limited, dimensionally constrained missile propulsion system. The turbojet engine results in minimum engine size while providing balanced thrust production at key transonic and supersonic flight conditions. The fluidic thrust vectoring system provides effective thrust vectoring capability with reduced mechanical complexity. And, the relative simplicity of the afterburning turbojet engine will correspondingly reduce the production cost thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A supersonic turbojet engine comprising:
   a core engine including a multistage axial compressor joined by a rotor to a high pressure turbine, with an annular combustor disposed therebetween;
   an afterburner disposed coaxially with an aft end of said core engine for receiving combustion gases therefrom;
   an exhaust nozzle including an inlet duct converging aft to a throat of minimum flow area, and an outlet duct diverging aft therefrom for diffusing said combustion gases discharged therefrom;
   a thrust vectoring system operatively joined to said compressor for receiving pressurized air therefrom, and operatively joined to said nozzle inlet and outlet ducts for selectively discharging said pressurized air therein; and
   a controller operatively joined to said thrust vectoring system for varying distribution of said pressurized air around said nozzle and thereby vector thrust from said combustion gases discharged through said nozzle.

2. An engine according to claim 1 wherein said thrust vectoring system comprises:
   a plurality of distribution valves joined in flow communication with said compressor by a plurality of inlet conduits, and joined in flow communication with said nozzle inlet and outlet ducts by a plurality of outlet conduits spaced circumferentially therearound; and
   said controller is operatively joined to said valves and configured for adjusting flow of said pressurized air through said valves for varying distribution thereof to vector said thrust.

3. An engine according to claim 2 wherein said outlet conduits comprise:
   a plurality of forward outlet conduits joined to said converging inlet duct for discharging said pressurized air therein; and
   a plurality of aft outlet conduits joined to said diverging outlet duct for discharging said pressurized air therein.

4. An engine according to claim 3 wherein said thrust vectoring system further comprises:
   a distribution manifold joined in flow communication with said distribution valves by said inlet conduits; and
   a plurality of bleed conduits joining said manifold in flow communication with said compressor.

5. An engine according to claim 4 wherein said distribution valves are configured for splitting said pressurized air between said forward and aft outlet conduits for discharge into said inlet and outlet ducts, respectively.

6. An engine according to claim 5 wherein said distribution valves are configured for increasing flow to said aft outlet conduits while decreasing flow to said forward outlet conduits, and vice versa.

7. An engine according to claim 6 wherein said distribution valves are configured for distributing flow uniformly through said forward outlet conduits to effect pressure recovery in said nozzle, and distributing flow nonuniformly through said aft outlet conduits to effect said thrust vectoring.

8. An engine according to claim 7 wherein:
said compressor includes sequential stages for progressively increasing pressure of said air; and
said bleed conduits are joined in flow communication with an intermediate stage of said compressor for bleeding interstage air therefrom.

9. An engine according to claim 7 wherein:
said compressor includes sequential stages for progressively increasing pressure of said air; and
said bleed conduits are joined in flow communication with the discharge end of said compressor for bleeding compressor discharge air therefrom.

10. An engine according to claim 7 wherein:
said bleed conduits, manifold, and inlet conduits provide an unobstructed flowpath from said compressor to said distribution valves; and
said distribution valves are configured for continuous flow.

11. A turbojet engine for powering a supersonic missile comprising:
a core engine including a multistage axial compressor joined by a rotor to a high pressure turbine, with an annular combustor disposed therebetween;
an afterburner disposed coaxially with an aft end of said core engine for receiving combustion gases therefrom;
a converging-diverging exhaust nozzle disposed coaxially with an aft end of said afterburner for discharging said combustion gases, and having a variable area throat; and
a thrust vectoring system operatively joined to said compressor for receiving pressurized air therefrom, and operatively joined to said nozzle for selectively discharging said pressurized air therein axially spaced from said throat; and
a controller operatively joined to said thrust vectoring system for varying distribution of said pressurized air around said nozzle and thereby vector thrust from said combustion gases discharged through said nozzle.

12. An engine according to claim 11 wherein said thrust vectoring system comprises:
a plurality of distribution valves joined in flow communication with said compressor by a plurality of inlet conduits, and joined in flow communication with said nozzle by a plurality of outlet conduits spaced circumferentially therearound; and
said controller is operatively joined to said valves and configured for adjusting flow of said pressurized air through said valves for varying distribution thereof to vector said thrust.

13. A turbojet engine for powering a supersonic missile comprising:
a core engine including a multistage axial compressor joined by a rotor to a high pressure turbine, with an annular combustor disposed therebetween;
an afterburner disposed coaxially with an aft end of said core engine for receiving combustion gases therefrom;
a converging-diverging exhaust nozzle including an inlet duct joined coaxially with an aft end of said afterburner and converging aft to a throat followed by a diverging outlet duct for discharging said combustion gases;
a thrust vectoring system operatively joined to said compressor for receiving pressurized air therefrom, and including forward outlet conduits joined to said converging inlet duct forward from said throat, and aft outlet conduits joined to said diverging outlet duct aft of said throat for selectively discharging said pressurized air therein; and
a controller operatively joined to said thrust vectoring system for varying distribution of said pressurized air through said forward and aft outlet conduits and thereby vector thrust from said combustion gases discharged through said nozzle.

14. An engine according to claim 13 wherein said thrust vectoring system further comprises:
a plurality of distribution valves joined in flow communication with said compressor by a plurality of inlet conduits, and joined in flow communication with said nozzle by said forward and aft outlet conduits spaced circumferentially around said nozzle;
said distribution valves are configured for splitting said pressurized air between said forward and aft outlet conduits for discharge into said inlet and outlet ducts, respectively; and
said controller is operatively joined to said valves and configured for adjusting flow of said pressurized air through said valves for varying distribution thereof to vector said thrust.

15. An engine according to claim 14 wherein said distribution valves are configured for increasing flow to said aft outlet conduits while decreasing flow to said forward outlet conduits, and vice versa.

16. An engine according to claim 14 wherein said distribution valves are configured for distributing flow uniformly through said forward outlet conduits to effect pressure recovery in said nozzle, and distributing flow nonuniformly through said aft outlet conduits to effect said thrust vectoring.

17. An engine according to claim 14 wherein said thrust vectoring system further comprises:
a distribution manifold joined in flow communication with said distribution valves by said inlet conduits; and
a plurality of bleed conduits joining said manifold in flow communication with said compressor.

18. An engine according to claim 17 wherein:
said compressor includes sequential stages for progressively increasing pressure of said air; and
said bleed conduits are joined in flow communication with an intermediate stage of said compressor for bleeding interstage air therefrom.

19. An engine according to claim 17 wherein:
said compressor includes sequential stages for progressively increasing pressure of said air; and
said bleed conduits are joined in flow communication with the discharge end of said compressor for bleeding compressor discharge air therefrom.

20. An engine according to claim 17 wherein:
said bleed conduits, manifold, and inlet conduits provide an unobstructed flowpath from said compressor to said distribution valves; and
said distribution valves are configured for continuous flow.

21. An engine according to claim 17 in combination with said supersonic missile and mounted inside an engine bay at an aft end thereof, and said turbojet engine further includes an intake extending forward from said core engine and forwardly through the side of said missile for receiving ambient air during subsonic to supersonic operation.

* * * * *